United States Patent
Constantine et al.

(10) Patent No.: US 9,629,496 B2
(45) Date of Patent: Apr. 25, 2017

(54) STEAMING PITCHER METHODS AND DEVICES

(71) Applicant: Espro, Inc., Vancouver (CA)

(72) Inventors: Bruce Constantine, North Attleboro, MA (US); Christopher R. McLean, Vancouver (CA)

(73) Assignee: ESPRO, INC., Vancouver (CA)

( * ) Notice: Subject to any disclaimer, the term of this patent is extended or adjusted under 35 U.S.C. 154(b) by 476 days.

(21) Appl. No.: 14/025,793

(22) Filed: Sep. 12, 2013

(65) Prior Publication Data

US 2014/0016429 A1   Jan. 16, 2014

Related U.S. Application Data

(63) Continuation of application No. 11/706,078, filed on Feb. 13, 2007, now abandoned.

(60) Provisional application No. 60/772,834, filed on Feb. 13, 2006.

(51) Int. Cl.
  *A23C 3/037* (2006.01)
  *A47J 31/44* (2006.01)
  *A47J 43/07* (2006.01)

(52) U.S. Cl.
  CPC ........... *A47J 31/4489* (2013.01); *A23C 3/037* (2013.01); *A47J 31/44* (2013.01); *A47J 43/0727* (2013.01)

(58) Field of Classification Search
  CPC .... A47J 31/4489; A47J 31/4485; A47J 27/04; A47J 27/16; A23C 3/037
  USPC .... 99/348, 293, 323.1, 323.2; 426/477, 523, 426/474; 366/130, 165.1, 165.2, 306, 101
  See application file for complete search history.

(56) References Cited

U.S. PATENT DOCUMENTS

| | | |
|---|---|---|
| 1,025,206 A | 5/1912 | Rounds |
| 1,581,877 A | 4/1926 | Schultz |
| 1,954,064 A | 4/1934 | Blitz |
| 2,468,661 A | 4/1949 | Gladstone |
| 2,516,703 A | 7/1950 | Kent |
| 2,592,485 A | 4/1952 | Stair |
| 2,793,790 A | 5/1957 | Kahler |
| 3,260,510 A | 7/1966 | Ranson |
| 3,589,683 A | 6/1971 | Robin |
| 4,066,722 A | 1/1978 | Pietruszewski et al. |
| D258,712 S | 3/1981 | Jacobson |
| 4,950,082 A | 8/1990 | Carlson |
| 5,141,134 A | 8/1992 | Machado |
| D335,608 S | 5/1993 | Arnold |
| 5,233,915 A * | 8/1993 | Siccardi ............. A47J 31/4489 239/520 |
| 5,335,588 A | 8/1994 | Mahlich |
| 5,423,425 A | 6/1995 | Stompe |
| 5,442,997 A * | 8/1995 | Branz ................ A47J 27/16 366/101 |
| 5,464,574 A | 11/1995 | Mahlich |
| 5,472,274 A | 12/1995 | Baillie |
| 5,487,486 A | 1/1996 | Meneo |
| 5,788,369 A | 8/1998 | Tseng |
| 6,296,884 B1 | 10/2001 | Okerlund |
| 6,324,963 B1 | 12/2001 | Cirasole |
| 6,792,848 B1 | 9/2004 | Janky |
| 6,811,299 B2 | 11/2004 | Collier |
| 6,840,163 B2 * | 1/2005 | Oldani ............... A47J 31/4485 99/293 |
| D501,354 S | 2/2005 | Graves et al. |
| 6,854,381 B2 | 2/2005 | Fischer |
| 2004/0237798 A1 * | 12/2004 | Payne .................... A47J 27/04 99/348 |

* cited by examiner

*Primary Examiner* — Reginald L Alexander
(74) *Attorney, Agent, or Firm* — Crawford Maunu PLLC

(57) ABSTRACT

A steaming pitcher comprising a flow receiving surface adapted to receive an incoming flow of steam at a substantially oblique angle provides enhanced control of fluid flow inside the steaming pitcher to enhance mixing and heating of the fluid by the incoming steam. The steaming pitcher may also comprise flow directing and launching surfaces to assist in control of fluid flow patterns. A flow control kit with a flow receiving surface may be installed in an existing flat-bottom steaming pitcher to provide aspects of fluid flow control. The flow receiving, flow directing and launching surfaces of the steaming pitcher may be substantially smooth, faceted, or a combination thereof.

17 Claims, 9 Drawing Sheets

FIG. 14 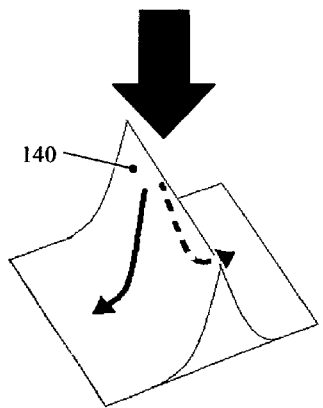 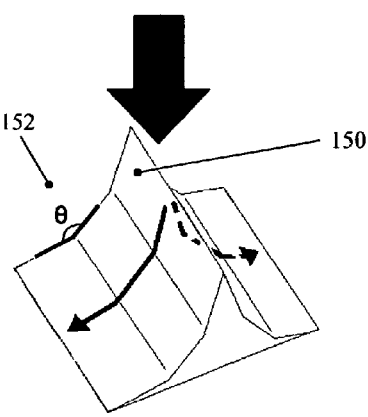 FIG. 15
FIG. 16 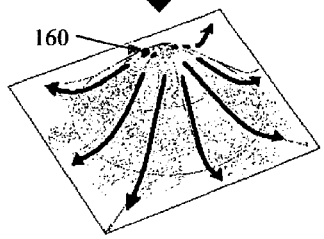 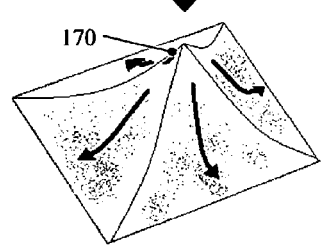 FIG. 17

STEAMING PITCHER METHODS AND DEVICES

CROSS-REFERENCE TO RELATED APPLICATIONS

This patent application is a continuation of and claims the benefit of priority to U.S. patent application Ser. No. 11/706,078, filed Feb. 13, 2007, which in turn claims the benefit of priority to U.S. Provisional Application Ser. No. 60/772,834, filed on Feb. 13, 2006, the disclosure of which is incorporated herein by reference in its entirety for any purpose whatsoever.

FIELD

This disclosure relates generally to fluid mixing containers. More particularly, this disclosure relates to steaming pitchers adapted for controlling fluid flow therein.

BACKGROUND

Steaming pitchers are known in the art for use in mixing steam with fluids, particularly dairy products such as milk, for use in the preparation of hot beverages such as espresso coffee drinks or steamed milk drinks. Typically a conventional steaming pitcher is partially filled with fluid, such as milk, and mixed with pressurized steam such as from a steaming wand of an espresso coffee machine to make in the pitcher heated fluid mixed or frothed by the steam. In the process of mixing and heating the milk with the steam, air is typically entrained into the mixture to form froth or foam, preferably in the form of very small bubbles in the milk, which is desirable for preparation of many mixed coffee beverages such as lattes or cappuccino, for example. Conventional steaming pitchers known in the art are typically made of stainless steel or other suitable metal and of generally cylindrical shape with a closed substantially flat bottom and open top, and a handle for holding by a user. Conventional steaming pitchers typically have sidewalls which extend upwards from a substantially flat bottom or base, and are either substantially straight (cylindrical shape), chined (dual-angled), or slightly bell shaped above the substantially flat bottom. Examples of conventional steaming pitchers known in the art may be found in the illustrations and descriptions of U.S. Pat. Nos. 6,792,848, 6,324,963 and D501,354.

In the use of a steaming pitcher, it is desirable that the steamed fluids prepared in the steaming pitcher be homogeneously mixed and heated by the steam, particularly in the case where milk is to be mixed with another fluid such as a flavoring syrup for example during the steaming process. Homogeneous mixing and heating of the fluids in the steaming pitcher is also desirable to improve the uniformity of froth or foam in the fluid mixture which preferably comprises very small bubbles of air entrained into the fluids by the flow of steam into the fluids and by the resulting flow of fluids inside the pitcher. The use of conventional steaming pitchers as known in the art, particularly by unskilled users, may commonly result in undesirable unevenly mixed and heated steamed fluids, due to one or more limitations in the design of conventional steaming pitchers. Specifically, when using a conventional steaming pitcher, the pressurized steam jet from a steaming wand typically reflects in a random or uncontrolled manner off the flat bottom of the conventional pitcher towards the surface of the fluid resulting in incomplete, uneven or inefficient mixing of the fluid, and the loss of steam to the atmosphere. Further, the rate of steam and fluid flow near the walls of the conventional pitcher or in areas near sharp angles between surfaces such as the bottom and the sidewalls may be much less than in the center of the fluid, resulting in incomplete or inefficient mixing or uneven heating of the fluid. Also, in using a conventional steaming pitcher with a steaming wand there is typically no discernable or distinct fluid flow pattern visible to the user from the top of the pitcher that indicates to the user that the flow rate of steam and location of the steaming wand are appropriate and resulting in effective mixing of the fluid.

It is an object of the present disclosure to provide an improved steaming pitcher that overcomes some of the limitations of the steaming pitchers known in the art.

SUMMARY

An inventive steaming pitcher is provided according to one embodiment of the disclosure comprising a bottom connected to a sidewall surface defining a top opening and an open internal cavity and a flow receiving surface at least a portion of which is adapted to receive an incoming flow of steam at a substantially oblique angle. The steaming pitcher may also comprise one or more of a flow directing surface and a launching surface adapted to launch a flow of fluid moving substantially tangentially to the launching surface inside the steaming container.

According to another embodiment of the disclosure, a method of controlling fluid flow in a steaming pitcher is provided employing a steaming pitcher comprising a bottom connected to a sidewall surface defining a top opening and an open internal cavity and a flow receiving surface, at least a portion of which is adapted to receive an incoming flow of steam at a substantially oblique angle. The inventive method comprises providing a volume of fluid to be steamed within the steaming pitcher, directing the incoming flow of steam into the volume of fluid such that a combined flow of fluid and steam is incident upon the flow receiving surface and adjusting the volumetric rate of the incoming flow of steam such that the combined flow of fluid and steam circulates within the steaming pitcher in a substantially positionally stable flow pattern relative to the pitcher.

According to a further embodiment of the disclosure, a steaming pitcher flow control kit is provided, comprising a flow control feature having a flow receiving surface at least a portion of which is adapted to receive an incoming flow of steam at a substantially oblique angle, wherein the flow control feature is adapted for insertion in a steaming pitcher comprising a substantially flat bottom surface. The steaming pitcher flow control kit may also comprise instructions for inserting the flow control feature and attaching the flow control feature to the substantially flat bottom of the steaming pitcher.

DESCRIPTION OF THE DRAWINGS

FIG. 14 is a perspective view of a ridge shaped flow control feature for use in a steaming pitcher, according to an embodiment of the present disclosure.

FIG. 15 is a perspective view of a faceted ridge shaped flow control feature for use in a steaming pitcher, according to an embodiment of the present disclosure.

FIG. 16 is a perspective view of a substantially conical flow control feature for use in a steaming pitcher, according to an embodiment of the present disclosure.

FIG. 17 is a perspective view of a substantially pyramidal flow control feature for use in a steaming pitcher, according to an embodiment of the present disclosure.

A detailed description of the embodiments of the present disclosure illustrated in the above Figures may be found in the following section. Some similar features shown in multiple Figures have been indicated with similar reference numerals.

DETAILED DESCRIPTION OF SEVERAL EMBODIMENTS

Figure 1:
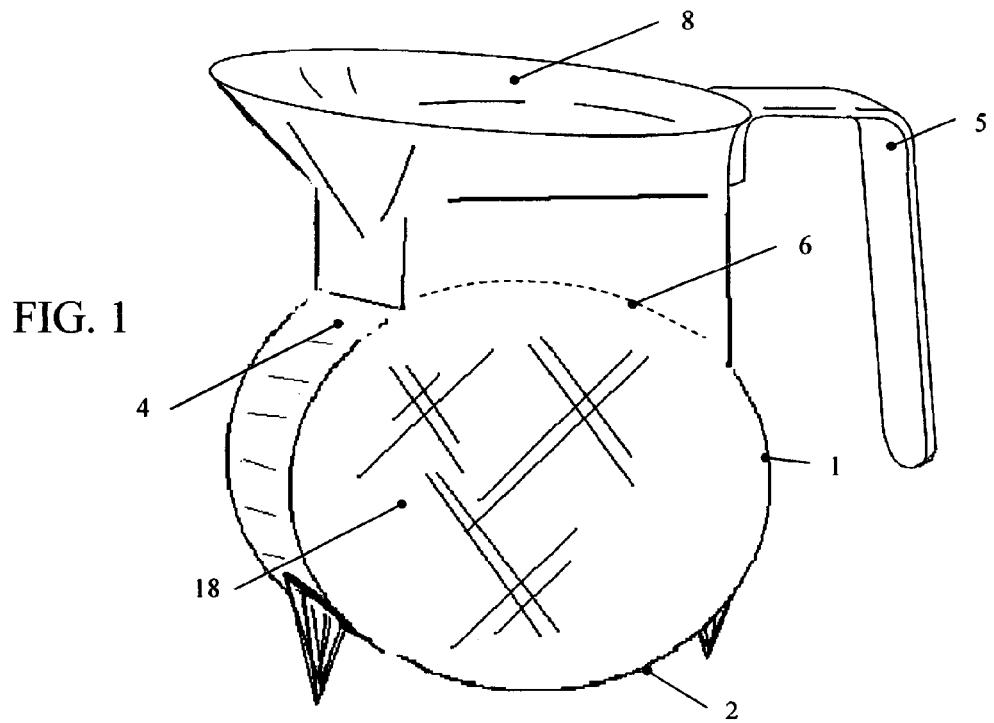
FIG. 1 is a perspective view of a steaming pitcher with flat sides having flow control surfaces, according to an embodiment of the present disclosure.

A steaming pitcher according to a first embodiment of the present disclosure is shown in FIG. 1 and includes a top opening 8, open internal cavity 6, flat sidewalls 18, and handle 5. The inventive steaming pitcher includes one or more structural members defining a flow receiving surface 1, adapted to receive an incoming flow of steam at a substantially oblique angle. The flow receiving surface 1 is connected to a substantially smooth arcuate flow directing surface 2, which is in turn connected to a substantially smooth launching surface 4. In this embodiment, the flow receiving surface 1 and launching surface 4 is defined by two curved sides of the steaming pitcher, while the flow directing surface 2 is defined by a curved bottom or base of the steaming pitcher. Additionally, in this embodiment, the flow receiving surface 1 connects smoothly to the flow directing surface 2 which connects smoothly to the launching surface 4, without an abrupt or substantial change in wall angle between the surfaces.

Figure 2:
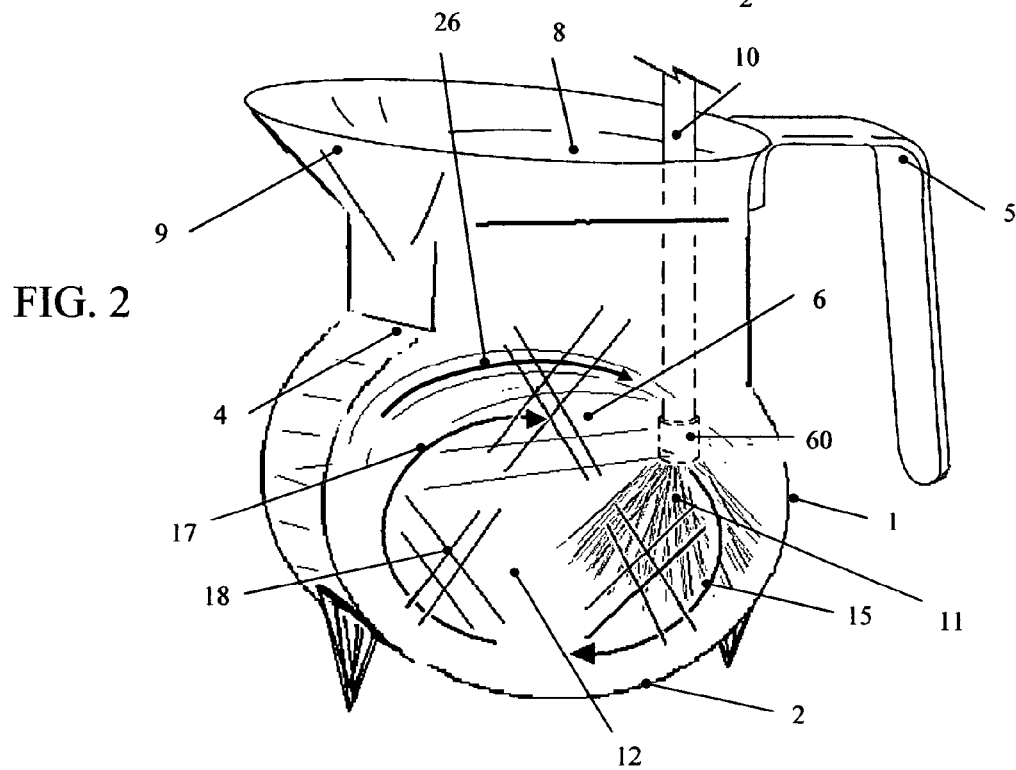
FIG. 2 is a perspective view of the inventive steaming pitcher shown in FIG. 1, depicting fluid flows inside the inventive pitcher during the steaming process.

A view of the first embodiment of the inventive steaming pitcher in use according to a method of the disclosure is shown in FIG. 2, showing steaming wand 10 inserted into the pitcher and delivering pressurized steam plume 11 from tip 60 into the volume of fluid 12 to be steamed in the pitcher. The pitcher is typically held by handle 5 by a user during use. The volume of steam delivered by steaming wand 10 into the fluid 12 in the steaming pitcher may typically be controlled by a user such as by controlling a knob or valve of an espresso coffee machine. The location at which the steam plume 11 contacts the wall of the steaming pitcher may typically be controlled by a user by varying the relative position of the steaming wand 10 within the pitcher. The steam plume 11 upon entering the fluid 12 creates generally linear motion of the fluid in the direction of the incoming steam, as the steam mixes with and propels the fluid in the vicinity of the tip of the steaming wand 10. Typically, the direction of the fluid flow changes only when the fluid encounters the inner surfaces of the steaming pitcher. The flow receiving surface 1 of the inventive steaming pitcher is adapted to receive the incoming flow of steam and fluid from the tip of the steaming wand 10 at a substantially oblique angle. In particular, flow receiving surface 1 is oriented largely tangential to the direction of steam-fluid flow, and the steam-fluid flow gently changes direction as it travels along the flow receiving surface 1 and remains more fully developed and controllable, rather than scattering or reflecting in a random or uncontrolled manner such as when contacting a surface closer to perpendicular to the direction of flow.

The flow of fluid then continues in the direction shown by curved flow path 15 from the flow receiving surface 1 to the substantially smooth arcuate flow directing surface 2 and remains developed and controlled, rather than undesirably scattering or reflecting randomly from contacting abrupt changes in surface angle along the path of the fluid flow, such as internal angles between surfaces that are less than about 135 degrees, and more particularly, less than about 120 degrees. An example of an angle between surfaces which is desirably greater than about 135 degrees so as to reduce scattering or reflecting flow disturbances is shown by angle 152 of FIG. 15. Returning now to FIG. 2, the flow of fluid then further continues along flow directing surface 2 in the general direction of flow path 17 to the substantially smooth launching surface 4. The direction of fluid flow across the launching surface 4 is substantially tangential to the launching surface 4, and the fluid flow is then launched and separates from the launching surface 4 under the force of gravity, and follows an arcing trajectory 26 falling into the open inner cavity 6 of the steaming pitcher. The trajectory of the fluid leaving the launching surface 4 may be controlled by varying the volume (and typically therefore also the velocity) of the steam plume 11 entering the fluid 12, such that with adjustment of the volume flow of steam into the fluid, the fluid leaving the launching surface 4 may fall back into the remaining fluid in the pitcher at the flow receiving surface 1, resulting in a relatively smooth and continuous flow of fluid and steam in the pitcher, which may desirably result in thorough and efficient mixing and heating of the fluid in the pitcher. In this manner, a user may be able to visually determine that a correct volume of steam is being introduced into the steaming pitcher to thoroughly mix and heat the fluid 12 by observing the substantially positionally stable fluid flow pattern within the pitcher wherein the fluid and steam flow leave the launching surface 4 and fall to rejoin the incoming steam plume 11 at or substantially adjacent to the flow receiving surface 1.

In an alternative embodiment of the disclosure (not shown), a steaming pitcher similar to that described in FIG. 1 above comprises a top opening, open internal cavity, flat sidewalls, and flow receiving surface adapted to receive an incoming flow of steam at a substantially oblique angle. The steaming pitcher may also comprise a flow directing surface and launching surface. In this embodiment, the flow receiving surface may be connected to the flow directing surface by one or more obtuse internal wall angles, such as internal angles greater than about 135 degrees (an example of an obtuse internal angle between surfaces greater than about 135 degrees is shown by angle 152 of FIG. 15), so as to approximate a substantially smooth connection and provide for developed and controlled flow of fluid from the flow receiving surface to the flow directing surface. Similarly, the flow receiving or flow directing surfaces may comprise one or more facets connected by obtuse internal wall angles such as internal angles of greater than about 135 degrees. Each such facet may comprise a curved or substantially planar surface, or a combination thereof. The flow directing surface may be connected to the launching surface by an obtuse internal angle, such as a change in internal pitcher wall angle of greater than about 120 degrees, and more particularly greater than about 135 degrees, so as to approximate a substantially smooth flow path and provide for developed and controlled fluid flow across the flow directing surface to the launching surface of the pitcher. An example of a flow receiving surface comprising six facets with obtuse internal angles between facets is shown as flow receiving surface 150 of FIG. 15, wherein exemplary obtuse internal angle 152 is desirably greater than about 120 degrees, and more particularly greater than about 135 degrees. In further alternative inventive embodiments, flow receiving surfaces, flow directing surfaces and launching surfaces may comprise any number of facets, wherein each facet may comprise a curved or substantially planar surface, or combination thereof.

Figure 3:
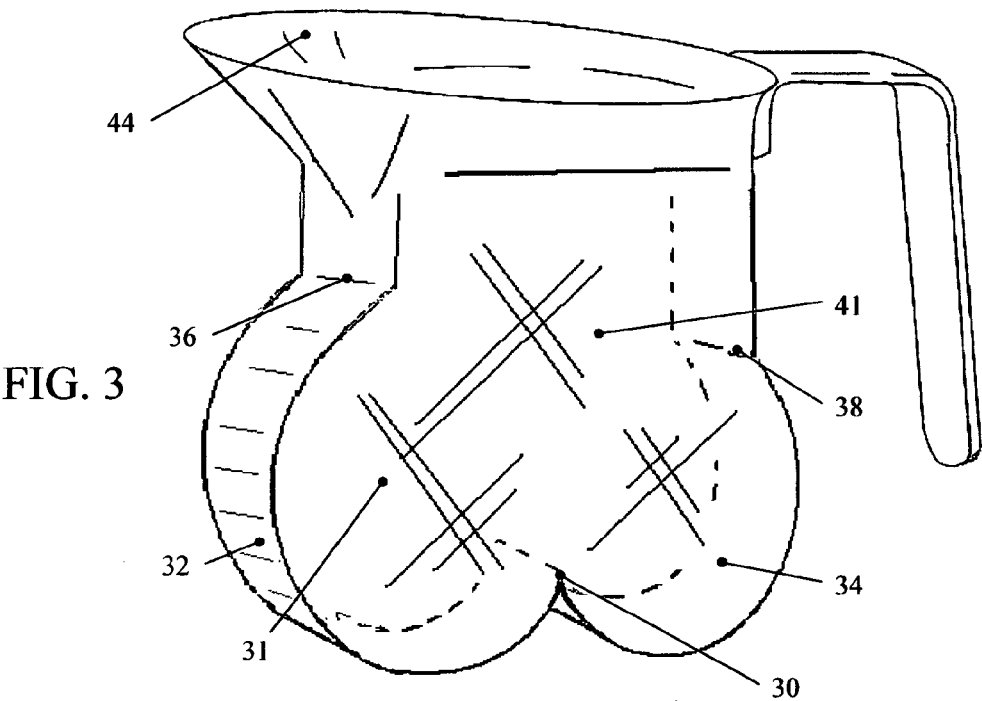
FIG. 3 is a perspective view of a steaming pitcher with flat sides and flow control surfaces, according to another embodiment of the present disclosure.

A steaming pitcher according to a second embodiment of the present disclosure is shown in FIG. 3 and includes a top opening 44, open internal cavity 41, and flat sidewalls 31. The inventive steaming pitcher also includes a central ridge-shaped flow receiving surface 30 adapted to receive an incoming flow of steam at a substantially oblique angle.

Figure 4:
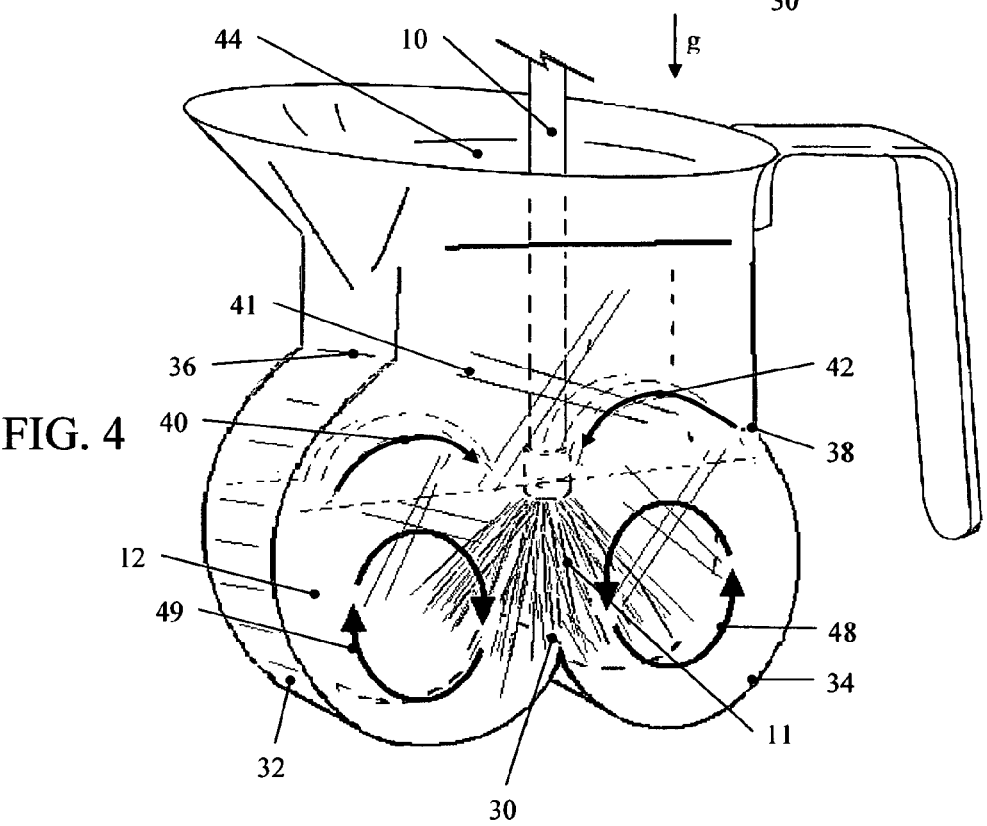
FIG. 4 is a perspective view of the inventive steaming pitcher shown in FIG. 3, depicting fluid flows inside the inventive pitcher during the steaming process.

Flow receiving surface 30 is shown connected to substantially smooth arcuate flow directing surfaces 32, and 34 on either side of the pitcher, which are in turn connected to substantially smooth launching surfaces 36 and 38 respectively. In this example, flow receiving surface 30 is shown smoothly connected to flow directing surfaces 32 and 34 which are in turn shown smoothly connected to launching surfaces 36 and 38 respectively, without an abrupt or substantial change in wall angle between the surfaces. In this embodiment, the launching surfaces 36 and 38 are defined by two curved sides of the steaming pitcher, while the flow directing surfaces 32 and 34 are defined by portions of the double curved bottom or base of the steaming pitcher. Another view of this embodiment of the inventive steaming pitcher in use according to a method of the disclosure is shown in FIG. 4, showing steaming wand 10 inserted into the pitcher and delivering pressurized steam plume 11 into the volume of fluid 12 in the pitcher. The flow of steam is shown incident on the flow receiving surface 30 at a substantially oblique angle, and the steam and fluid flow proceeds in the direction generally shown by curved flow paths 48 and 49 from the flow receiving surface 30 along the flow directing surfaces 32 and 34 to the launching surfaces 36 and 38, respectively. The direction of fluid flow across the launching surfaces 36 and 38 is substantially tangential to the launching surfaces, and the fluid flow is then launched and separates from launching surfaces 36 and 38 under the force of gravity, and typically follows arcing trajectories 40 and 42 respectively, falling into the open inner cavity 41 of the steaming pitcher. By adjustment of at least one of the volume flow of steam into the fluid, and the location of the steaming wand 10, the fluid may be caused to fall back into the pitcher substantially at or substantially adjacent to flow receiving surface 30, resulting in a substantially positionally stable fluid flow pattern visible to a user providing an indication to the user that the steam volume flow is suitable for thorough mixing and heating of the fluid.

Figure 5:
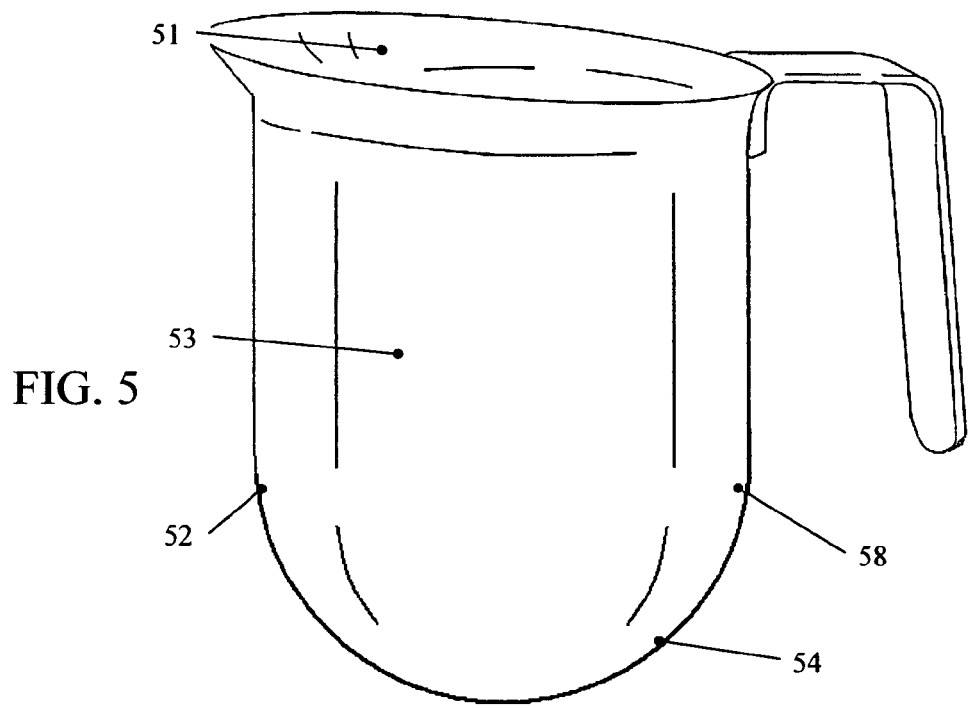
FIG. 5 is a perspective view of a steaming pitcher with a substantially round bottom and substantially round cross-section having flow control surfaces, according to an embodiment of the present disclosure.
Figure 6:
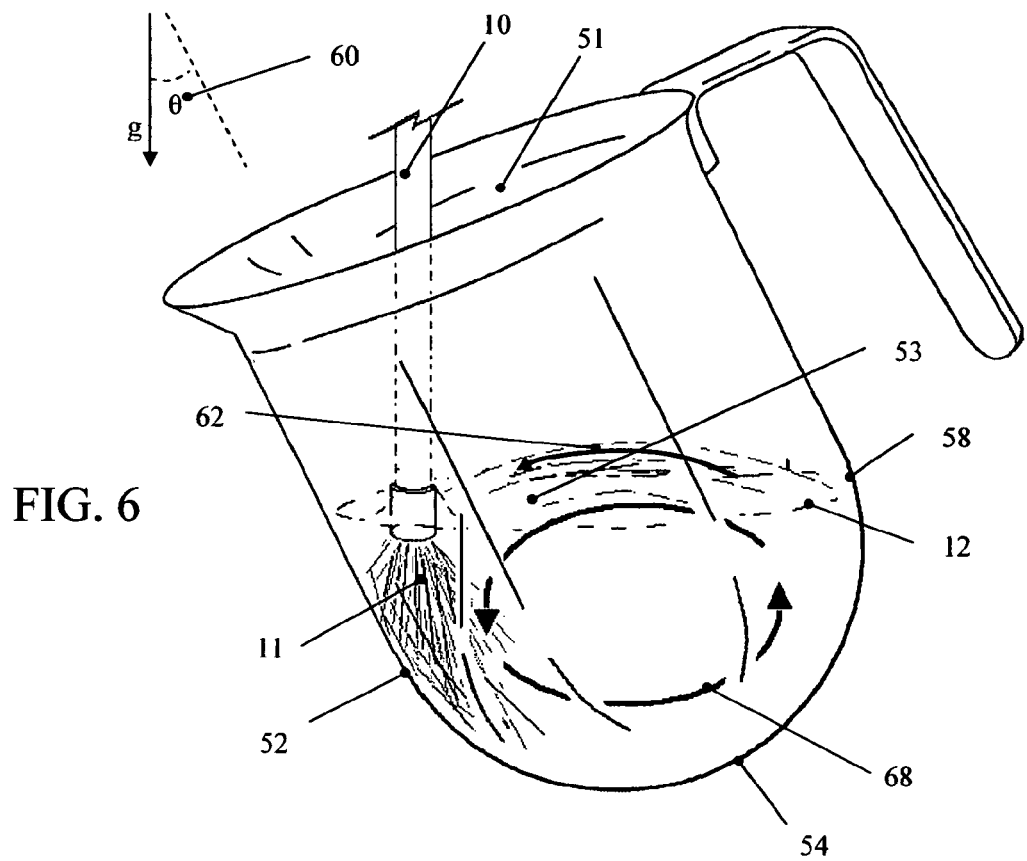
FIG. 6 is a perspective view of the inventive steaming pitcher shown in FIG. 5 depicting fluid flows inside the inventive pitcher during the steaming process.

FIG. 5 shows a further embodiment of the present inventive steaming pitcher with a substantially round cross-section, including a top opening 51, open internal cavity 53, and flow receiving surface 52 adapted to receive an incoming flow of steam at a substantially oblique angle. The inventive pitcher also has a substantially smooth arcuate flow directing surface 54 defined by a rounded bottom of the pitcher, and substantially smooth launching surface 58. A view of this embodiment of the inventive steaming pitcher in use according to a method of the disclosure is shown in FIG. 6, showing steaming wand 10 inserted into the pitcher and delivering pressurized steam plume 111 into the volume of fluid 12 in the pitcher. The flow of steam is incident on the flow receiving surface 52 at a substantially oblique angle, and the steam and fluid flow proceeds in the general direction shown by curved flow paths 68 from the flow receiving surface 52 along the flow directing surface 54 to the launching surface 58. The pitcher is tilted relative to the direction of gravitational force by angle 60, so that the fluid flow moving substantially tangential to the launching surface 58 is launched and separates from launching surface 58 under the force of gravity, following arcing trajectory 62, falling into the open inner cavity 53 of the steaming pitcher generally towards flow receiving surface 52. By adjustment of at least one of the volume flow of steam into the fluid, and the location of steaming wand 10, the fluid may be controlled to fall back into the pitcher substantially at the flow receiving surface 52 resulting in a substantially positionally stable fluid flow pattern visible to a user, providing an indication to the user that the steam volume flow is suitable for thorough mixing and heating of the fluid.

Figure 7:
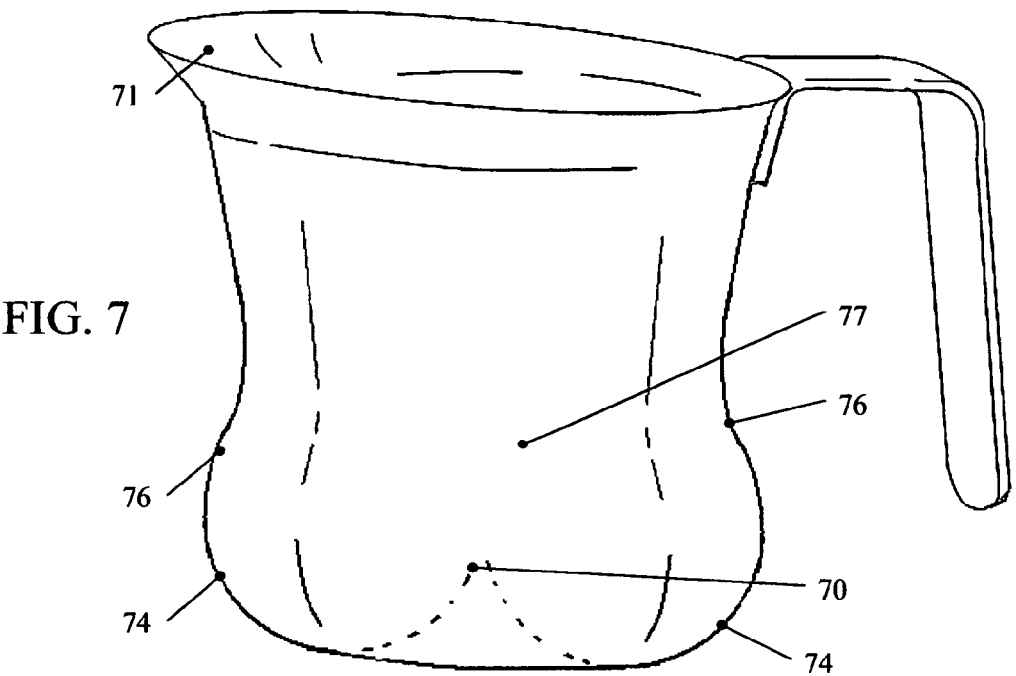
FIG. 7 is a perspective view of a steaming pitcher with curved sides and substantially round cross-section having flow control surfaces, according to an embodiment of the present disclosure.
Figure 8:
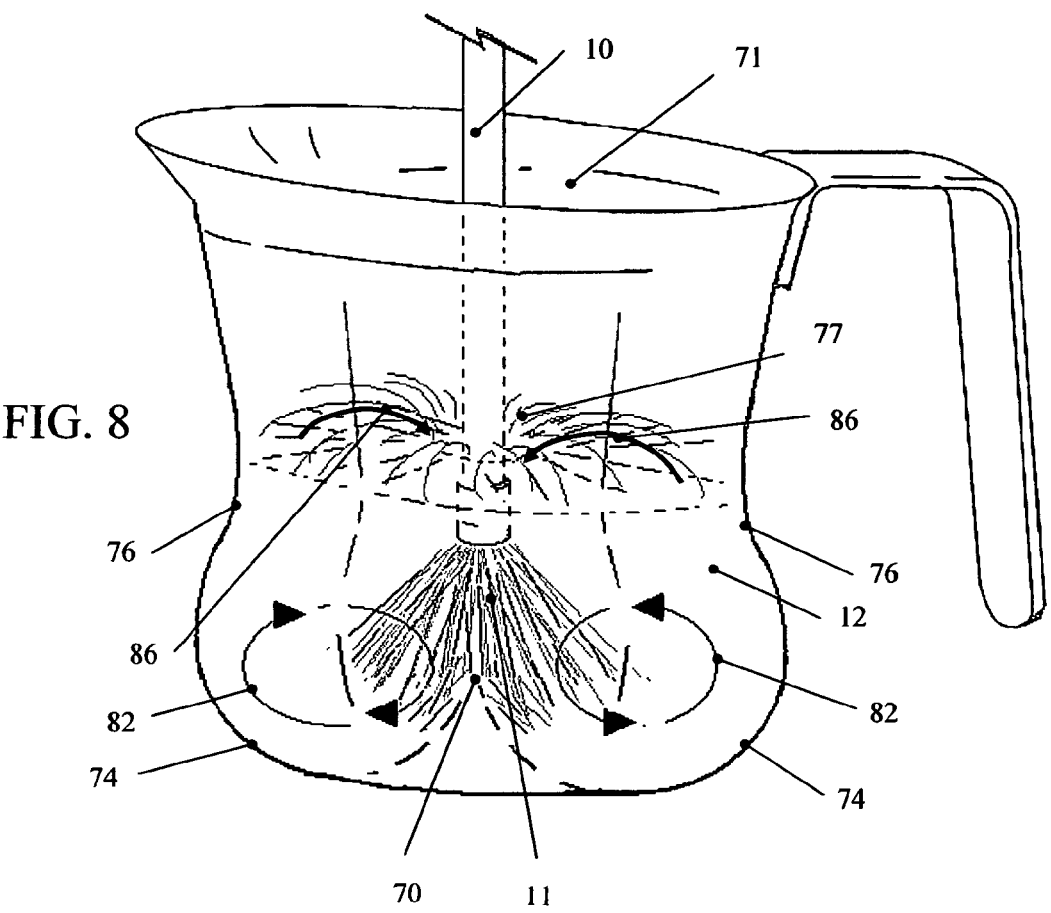
FIG. 8 is a perspective view of the inventive steaming pitcher shown in FIG. 7 depicting fluid flows inside the inventive pitcher during the steaming process when a steaming wand is held substantially centered in the steaming pitcher.

FIG. 7 shows a further embodiment of the present inventive steaming pitcher with a substantially round cross-section, including a top opening 71, open internal cavity 77 and central substantially conical flow receiving surface 70 adapted to receive an incoming flow of steam at a substantially oblique angle. The inventive pitcher also has a substantially smooth toroidal flow directing surface 74 connected to flow receiving surface 70 forming a rounded toroidal portion of the bottom of the pitcher, and substantially smooth circumferential launching surface 76 extending around the pitcher like a band and smoothly connected to flow directing surface 74. Another view of this embodiment of the inventive steaming pitcher in use according to a method of the disclosure is shown in FIG. 8, showing steaming wand 10 inserted into the pitcher and delivering pressurized steam plume 11 into the volume of fluid 12 in the pitcher. The flow of steam is shown incident on the substantially conical flow receiving surface 70 at a substantially oblique angle and the flow of steam and fluid moves radially outward from the center of the flow receiving surface 70 in the generally toroidal flow direction shown by flow path 82 from the flow receiving surface 70 along the flow directing surface 74 to the circumferential launching surface 76. The direction of the fluid flow is substantially tangential to the launching surface 76 and the fluid flow is then launched and separates from launching surface 76 under the force of gravity, following inward arcing trajectory 86, falling into the open inner cavity 77 generally toward flow receiving surface 70 of the steaming pitcher in a generally toroidal flow pattern. By adjustment of at least one of the volume flow of steam into the fluid, and the location of steaming wand 10, the fluid may be caused to fall back into the pitcher at the central conical flow receiving surface 70 resulting in a substantially positionally stable and generally toroidal fluid flow pattern visible to a user to indicate that the steam volume flow is suitable for thorough mixing and heating of the fluid.

In an alternative embodiment (not shown) of the disclosure, a steaming pitcher similar to that described in FIG. 7, above, comprises a top opening, open internal cavity and a central substantially pyramidal flow receiving surface adapted to receive an incoming flow of steam at a substantially oblique angle. This inventive pitcher may also have a faceted flow directing surface extending outwards from the central flow receiving surface, and launching surface. In this embodiment, facets of the central pyramidal flow receiving surface may be connected to facets of the flow directing surface by one or more obtuse internal pitcher wall angles, such as internal wall angles greater than about 120 degrees, and more particularly greater than about 135 degrees so as to approximate a substantially smooth connection between surfaces and provide for developed and controlled flow of fluid from the flow receiving surface to the flow directing surface. Similarly, the flow receiving and flow directing surface may each comprise multiple facets connected by obtuse internal pitcher wall angles, such as internal wall angles greater than about 120 degrees and more particularly greater than about 135 degrees. Each such facet may comprise a curved or substantially planar surface, or a combination thereof. Further, the flow directing surface may also be connected to the launching surface by an obtuse internal pitcher wall angle such as an internal angle greater than about 120 degrees and more particularly greater than about 135 degrees, so as to approximate a substantially smooth flow path providing for developed and controlled fluid flow across the flow directing surface to the launching surface of the pitcher. An example of a substantially pyramidal flow receiving surface comprising four facets is shown as flow receiving surface 170 of FIG. 17, as further described below. In further related alternative inventive embodiments, flow receiving surfaces, flow directing surfaces and launching surfaces may comprise any number of facets, wherein each facet may comprise a curved or substantially planar surface, or combination thereof.

Figure 9:
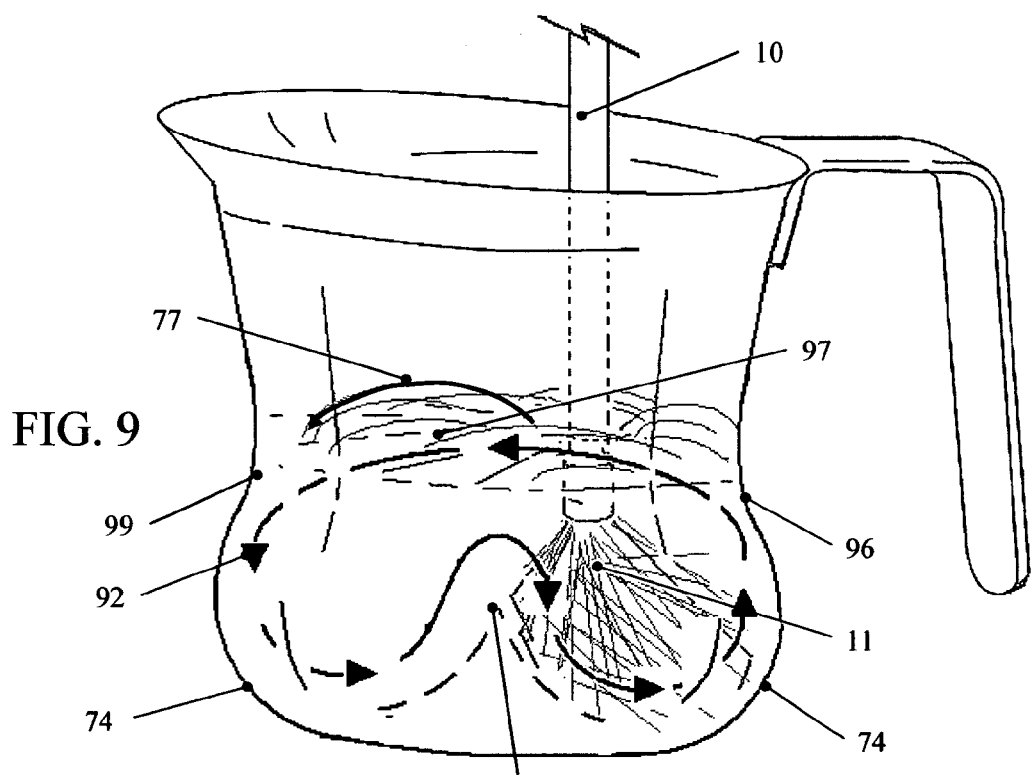
FIG. 9 is a perspective view of the inventive steaming pitcher shown in FIG. 7 depicting fluid flows inside the inventive pitcher during the steaming process when a steaming wand is held substantially off-center in the steaming pitcher, and substantially away from the wall of the steaming pitcher.

An alternative application of the embodiment of the disclosure of FIG. 7 is shown in FIG. 9, wherein steaming wand 10 is positioned substantially off-center in the steaming pitcher, but substantially away from the wall of the steaming pitcher. In this alternative application, the flow of steam is incident on only one portion of the substantially conical flow receiving surface 70 and the flow of steam and fluid moves generally radially outward from the point of incidence on flow receiving surface 70. This results in an asymmetrical toroidal flow pattern across the flow directing surface 74 and towards the circumferential launching surface 96 on the side of the pitcher nearest to the steaming wand 10. The direction of the fluid flow is substantially tangential to the launching surface 96 on that side of the pitcher and the fluid flow is then launched and separates from launching surface 96 under the force of gravity, following arcing asymmetrical trajectory 77, falling into the open inner cavity 97 of the steaming pitcher in an asymmetrical toroidal flow pattern. However, the launching surface 99 on the side of the pitcher opposite the steaming wand 10 acts instead as a flow receiving surface whereby fluid flow from launching surface 96 is incident on flow receiving surface 99, and returns to the steam plume 11 via flow directing surface 74 as shown by flow direction arrow 92, thus completing the asymmetrical toroidal flow pattern within the pitcher. By adjustment of the volume flow of steam into the fluid, the fluid may be controlled to circulate and fall back into the pitcher in a substantially positionally stable and generally asymmetrical toroidal fluid flow pattern visible to a user to indicate to the user that the steam volume flow is suitable for thorough mixing and heating of the fluid.

Figure 10:
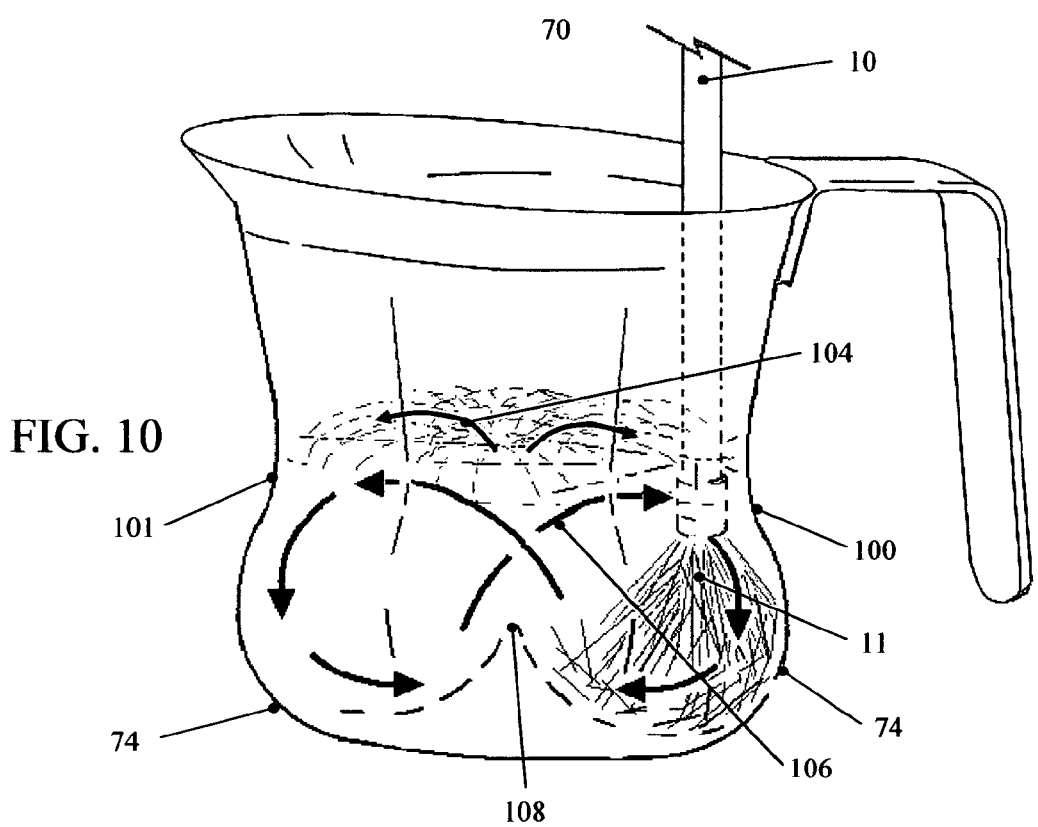
FIG. 10 is a perspective view of the inventive steaming pitcher shown in FIG. 7 depicting fluid flows inside the inventive pitcher during the steaming process when a steaming wand is held substantially against the wall of the steaming pitcher.

A further alternative application of the embodiment of the disclosure of FIG. 7 is shown in FIG. 10, wherein steaming wand 10 is shown positioned substantially against one part of the wall of the steaming pitcher. In this alternative application, the flow of steam is incident at a substantially oblique angle on the outside wall of the pitcher which acts as a flow receiving surface 100. The flow of steam and fluid moves generally inward from the point of incidence on flow receiving surface 100. This results in an asymmetrical toroidal flow pattern across the toroidal flow directing surface 74 and inwards towards the central conical launching surface 108. The direction of the fluid flow is substantially tangential to the conical launching surface 108 and the fluid flow is then launched and separates from launching surface 108 under the force of gravity, following outward trajectory 104 in an asymmetrical outward toroidal flow pattern. Fluid flow from launching surface 108 that is incident on flow receiving surface 100 returns directly to steam plume it, whereas fluid flow that is incident on flow receiving surface 101 located opposite from steaming wand 10 returns to steam plume 11 via flow directing surface 74 and launching surface 108 as shown by flow direction arrow 106, thus completing the asymmetrical toroidal flow pattern within the pitcher. By adjustment of at least one of the volume flow of steam into the fluid and the position of the steaming wand 10, the fluid may be caused to circulate and fall back into the pitcher in a substantially positionally stable and generally asymmetrical toroidal fluid flow pattern visible to a user to indicate that the steam volume flow is suitable for thorough mixing and heating of the fluid.

Figure 11:
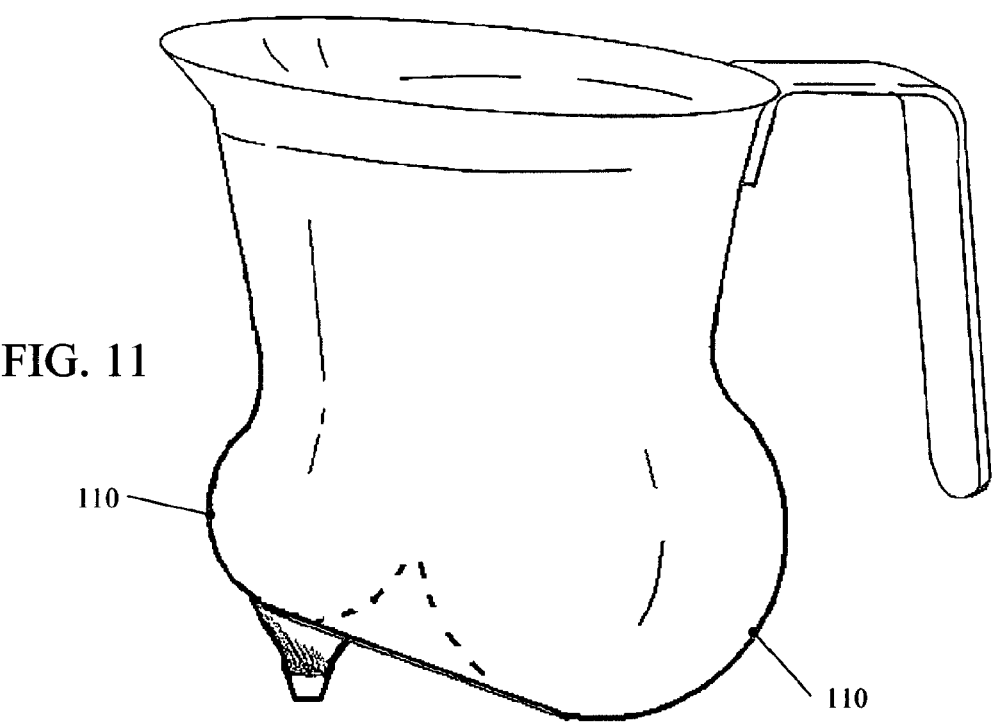
FIG. 11 is a perspective view of a steaming pitcher with asymmetrically curved sides having flow control surfaces, according to an embodiment of the present disclosure.

In addition to the asymmetric toroidal flow patterns shown and described in FIGS. 9 and 10, the overall shape of a toroidal embodiment of the inventive steaming pitcher may be asymmetric in orientation. For example, an alternative asymmetrical toroidal embodiment of the inventive steaming pitcher is shown in FIG. 11, wherein toroidal flow directing surface 110 is asymmetric relative to the rest of the pitcher.

Figure 12:
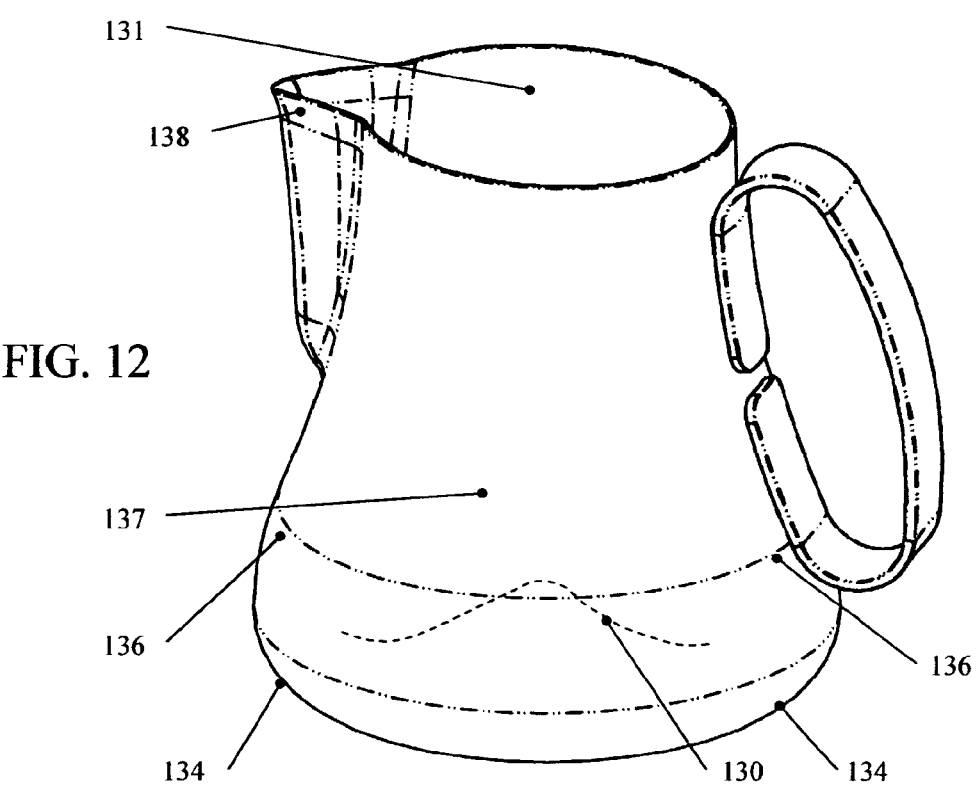
FIG. 12 is a perspective view of a steaming pitcher with curved, inwardly tapered sides and substantially round cross-section having flow control surfaces, according to an embodiment of the present disclosure.
Figure 13:
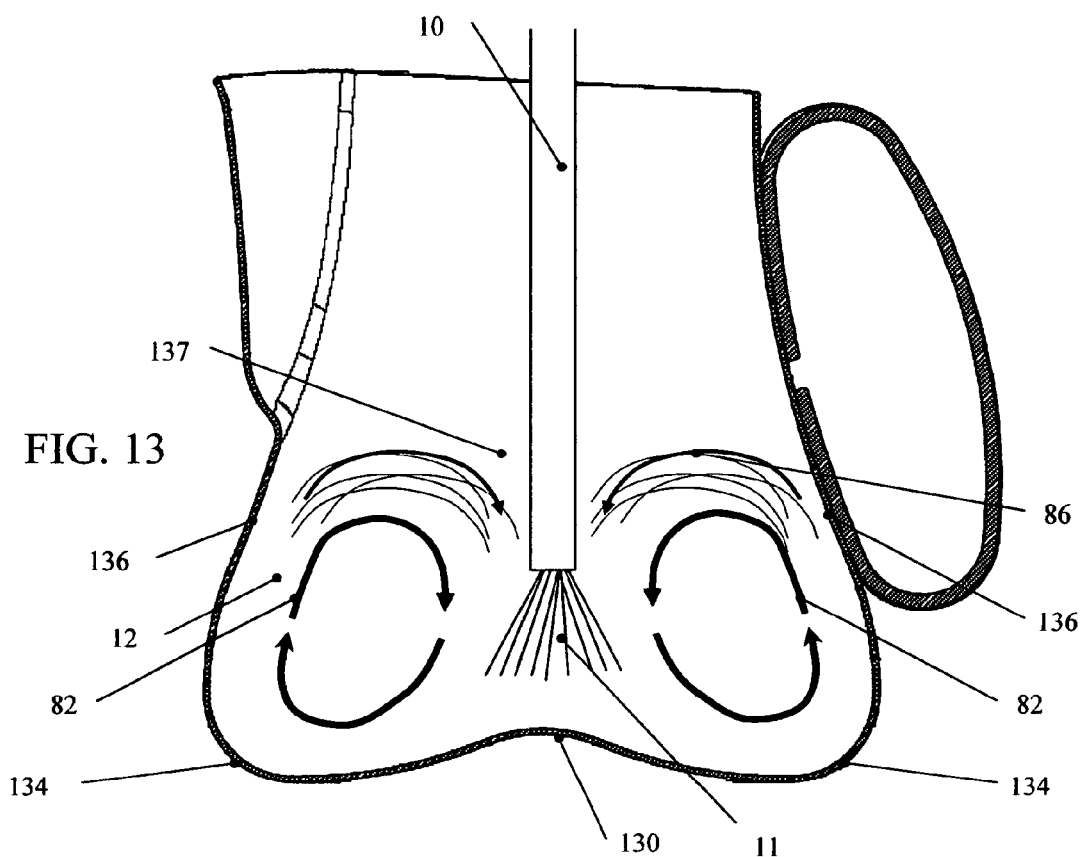
FIG. 13 is a cross-sectional view of the steaming pitcher shown in FIG. 12.

A further embodiment of the present inventive steaming pitcher with upward tapering sidewalls is shown in FIGS. 12 and 13. Similar to the embodiment shown in FIG. 8, the steaming pitcher embodiment shown in FIGS. 12 and 13 includes a substantially round cross-section, including a top opening 131, open internal cavity 137, and central substantially conical flow receiving surface 130 adapted to receive an incoming flow of steam at a substantially oblique angle. This inventive steaming pitcher also includes a substantially smooth toroidal flow directing surface 134 defined by a rounded toroidal portion of the bottom of the pitcher smoothly connected to the flow receiving surface 130, and substantially smooth circumferential launching surface 136 extending around the pitcher like a band and smoothly connected to the flow directing surface 134. Spout 138 is formed into a portion of the upward tapering sidewalls of the pitcher, and is shown with a relatively narrow spout opening in the pitcher sidewall, such as is suitable for use in the decorative pouring of steamed milk from the pitcher where fine control of a poured stream is desired. FIG. 13 shows the inventive steaming pitcher in use similar to FIG. 8, wherein steaming wand 10 delivering pressurized steam plume 11 into the volume of fluid 12 in the pitcher. Also similar to FIG. 8, fluid flow within the pitcher follows generally in the direction of flow arrow 82 in a generally toroidal flow pattern. By adjustment of at least one of the volume flow of steam into the fluid, and the location of steaming wand 10, the fluid may be controlled to fall back into the pitcher in the general direction of arrow 86 towards the central conical flow receiving surface 130 resulting in a substantially positionally stable and generally toroidal fluid flow pattern visible to a user to indicate to the user that the steam volume flow is suitable for thorough mixing and heating of the fluid.

FIGS. 14 and 15 show standalone or retrofittable flow control features or inserts according to the present disclosure suitable for use as flow receiving surfaces in steaming pitchers with two flat sides, and two curved, bell-shaped or faceted sides, such as the steaming pitcher shown in FIG. 1. FIG. 14 shows a smooth ridge-shaped flow receiving surface 140, while FIG. 15 shows a faceted ridge-shaped flow receiving surface 150 wherein the angles between the facets such as angle 152, are obtuse, such as greater than about 135 degrees. Both ridge-shaped flow receiving surfaces 140 and 150 may be used as a centrally located flow receiving surface in conjunction with a flat-sided pitcher design similar to that shown in FIG. 1 to receive and divert an incident fluid and steam flow into two directions. In such an application, flow receiving surfaces 140 or 150 may be attached or otherwise suitably situated in a flat sided steaming pitcher, thus providing additional flow control features in an existing steaming pitcher design.

Figure 18:
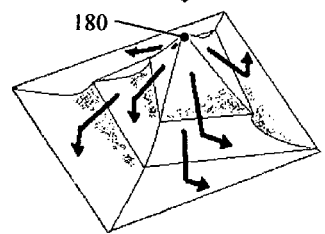
FIG. 18 is a perspective view of a faceted substantially pyramidal flow control feature for use in a steaming pitcher, according to an embodiment of the present disclosure.

FIGS. 16, 17 and 18 show additional standalone or retrofittable flow control features or inserts according to the present disclosure. FIG. 16 shows a standalone conical flow receiving surface 160. FIG. 17 shows a standalone pyramidal flow receiving surface 170, and FIG. 18 shows a standalone faceted pyramidal flow receiving surface 180, wherein the internal angles between facets are preferably obtuse, such as greater than about 135 degrees. Standalone flow receiving surfaces 160, 170 and 180 are suitable for use in combination with conventional generally cylindrical steaming pitchers with flat bottoms and particularly suitable for use with conventional flat-bottom steaming pitchers with bell-shaped sidewalls such as the steaming pitcher 190 shown in FIG. 19. In FIGS. 17 and 18 the exemplary flow receiving surfaces 170 and 180 are shown having 4 facets and 11 facets respectively, whereas in other embodiments, similar such generally pyramidal flow receiving surfaces may have any desired number of facets. Standalone flow control features comprising a flow receiving surface adapted to receive an incoming flow of steam at a substantially oblique angle may be applied to an existing steaming pitcher by attaching or otherwise situating the flow receiving surface generally in the center of the bottom of the pitcher, thus providing some of the benefits of improved fluid flow development and control according to the present disclosure. In one example, a flow control feature comprising a flow receiving surface such as exemplary features 160, 170 or 180, may be attached to the center of the flat bottom of a conventional steaming pitcher by chemically bonding, welding or magnetically attaching the flow control feature to the conventional steaming pitcher, such as by employing mutually attractive magnets attached to the flow control feature and to the bottom of the steaming pitcher.

Figure 19:
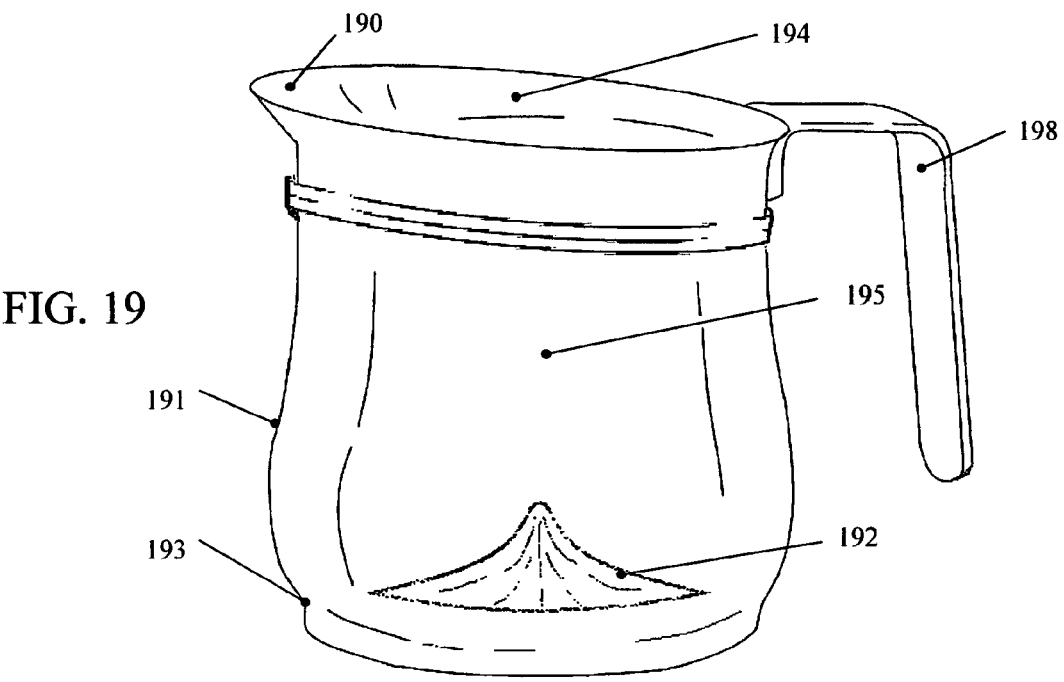
FIG. 19 is a perspective view of a two-piece steaming pitcher with curved sides and substantially round cross-section having an insert flow control feature with a flow control surface, according to an embodiment of the present disclosure.

FIG. 19 shows the retrofit of a conventional substantially flat bottom steaming pitcher with a standalone flow control feature or insert comprising a flow receiving surface adapted to receive an incoming flow of steam at a substantially oblique angle. In particular, upon the addition of a standalone flow receiving surface such as flow receiving surfaces 160, 170 or 180 as flow receiving surface 192, the retrofitted bell-shaped pitcher 190 includes a top opening 194, an open internal cavity 195 and a flow receiving surface 192. The illustrated retrofitted bell-shaped pitcher also has a substantially smooth flow directing surface 193 and a substantially smooth launching surface 191, thus providing aspects of an embodiment of the present disclosure for realizing improved fluid flow control during steaming relative to the unimproved substantially flat bottom and bell-walled conventional pitcher design. Standalone flow control features according to the disclosure comprising a flow receiving surface such as 140, 150, 160, 170 or 180 may also be supplied as a steaming pitcher flow control kit for retrofitting an existing generally flat-bottom steaming pitcher. Such a flow control kit may also include instructions specifying how to install the flow control feature in an existing steaming pitcher.

Figure 20:
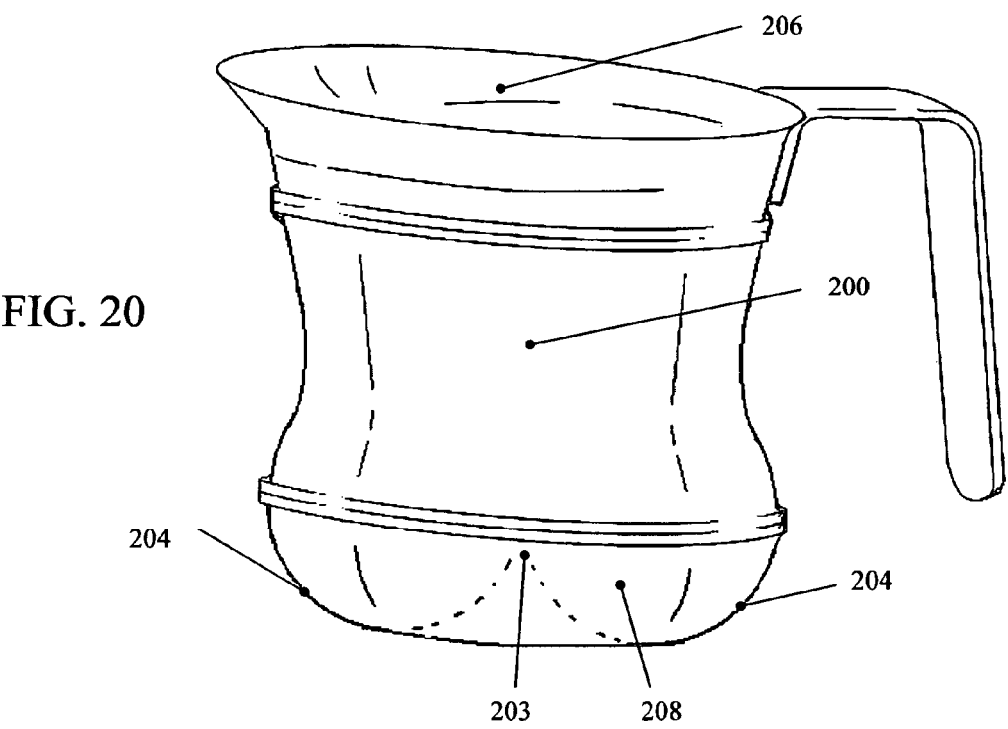
FIG. 20 is a perspective view of a two-piece steaming pitcher with curved sides and substantially round cross-section having flow control surfaces, according to an embodiment of the present disclosure.

In an optional embodiment, the upper portion of pitcher 190 comprising top opening 194 and handle 198 may be interchanged to provide additional flexibility for the desired function of the pitcher 190 without requiring the replacement of the entire pitcher. Similarly, FIG. 20 shows a multi-piece pitcher comprising separately interchangeable top 206, middle 200 and bottom 208 portions providing yet further flexibility to select design features suited for a particular intended usage. For example, the bottom section 208 comprises central conical flow receiving surface 203 and toroidal flow directing surface 204 flow control features of embodiments of the present disclosure, the middle section 200 comprises a circumferential launching surface flow control feature, both of which are interchangeable with top section 206 to allow the selection of flow control design features as required by the user, without the requirement to replace the entire steaming pitcher.

In another embodiment of the disclosure, generally spiral orientation of facets such as shown in faceted flow receiving surface 180 in FIG. 18 may be implemented in the faceted flow directing or flow launching surfaces of a steaming pitcher according to the disclosure. In such a manner, the generally concentrically spiraling orientation of facets of the flow receiving and flow directing or launching surfaces of the steaming pitcher may provide a spiral character to the directed flow pattern of fluid flow in the steaming pitcher during use.

In any of the above described embodiments of the disclosure, dissolvable solids or additional fluids, or combinations thereof may be added to the primary fluid being steamed in the steaming pitcher for mixing with the primary fluid. In a particular embodiment of the present disclosure, dissolvable solids such as chocolate, sweeteners or other confectionery, or other fluids such as flavoring syrup or liqueurs for example may be added to milk or other primary fluids for mixing in the steaming pitchers of the present disclosure.

The embodiments of the present disclosure described above are not intended to be limited to use in steaming fluids for beverage purposes. In another embodiment of the present disclosure, a fluid mixing container is provided including a bottom surface connected to a sidewall surface defining a top opening and an open internal cavity and a flow receiving surface adapted to receive an incoming flow of gas at a substantially oblique angle. The fluid mixing container according to this embodiment may also have a substantially smooth arcuate flow directing surface and/or a substantially smooth launching surface comprising at least a portion of the sidewall surface and adapted to launch a flow of fluid moving substantially tangentially to the launching surface inside the fluid mixing container. Alternatively, flow receiving, flow directing or launching surfaces of the fluid mixing container may be faceted, comprising one or more facets which may be curved or substantially planar surfaces, or a combination thereof. The fluid mixing container may be used to mix any suitable fluids by means of introducing a flow of a suitable mixing gas to the fluid mixing container containing the fluids. For example, the fluid mixing container of the present embodiment may be used to improve mixing of fluid chemical agents by introducing a flow of an inert gas. In another embodiment, a flow of gas may be used to mix a fluid or mixture of fluids with a suitable dissolvable solid in the inventive fluid mixing container, such as to improve the dissolution of the solid in the fluid or mixture of fluids for example. In yet another embodiment, the fluid mixing container may be used to mix multiple gases together without the presence of a liquid fluid. In a further embodiment, the fluid mixing container may be used to mix or clean a non-dissolvable solid with an incoming fluid stream wherein the container may comprise one or more drain apertures to allow excess incoming fluid to escape, such as in a fluid mixing container for washing rice with an incoming flow of water, for example.

As will be apparent to one skilled in the art, numerous variations and modifications can be made to the embodiments disclosed above without departing from the spirit of the present disclosure. Therefore, it should be clearly understood that the form of disclosed embodiments detailed above and shown in the accompanying Figures is illustrative only and is not intended to limit the scope of the present invention.

What is claimed is:

1. A method of controlling fluid flow in a steaming pitcher wherein the steaming pitcher includes a bottom connected to a sidewall surface defining a top opening and an open internal cavity and a flow receiving surface, at least a portion of which is adapted to receive an incoming flow of steam at substantially oblique angle, the method comprising:
providing a volume of fluid to be steamed within the steaming pitcher;
directing the incoming flow of steam into the volume of fluid such that a combined flow of fluid and steam is incident upon the flow receiving surface at an oblique angle; and
adjusting at least one of the volumetric rate and location of the incoming flow of steam such that the combined flow of fluid and steam circulates within the steaming pitcher in a substantially positionally stable flow pattern relative to the pitcher such that the substantially positionally stable flow pattern is made visible to a user looking into the steaming pitcher through the top opening.

2. The method of controlling fluid flow in a steaming pitcher according to claim 1, further comprising:
further directing the combined flow of fluid and steam after contact with the flow receiving surface via a flow directing surface.

3. The method of controlling fluid flow in a steaming pitcher according to claim 2, further comprising:
launching the directed flow of fluid and steam substantially tangentially to a launching surface inside the steaming container.

4. The method of controlling fluid flow in a steaming pitcher according to claim 3 wherein the flow receiving and flow directing surfaces each include at least one of: a substantially smooth curved surface and a substantially planar surface.

5. The method of controlling fluid flow in a steaming pitcher according to claim 4, wherein the flow of fluid and steam is launched so as to fall substantially towards the flow receiving surface.

6. The method of controlling fluid flow in a steaming pitcher according to claim 1 wherein the volume of fluid to be steamed provided includes milk.

7. The method of controlling fluid flow in a steaming pitcher according to claim 1 wherein the adjusting is performed such that substantially positionally stable flow pattern is visually distinct to the user, and indicates that the flow of steam is incident on the flow receiving surface.

8. The method of controlling fluid flow in a steaming pitcher according to claim 1, further comprising:
providing solid matter in the volume of fluid to be steamed which may be dissolved in the fluid.

9. The method of claim 1, wherein the flow receiving surface is a flow dividing surface that is disposed at the bottom of the steaming pitcher such that the combined flow of liquid and steam is divided when it reaches the bottom of the steaming pitcher.

10. The method of claim 9, wherein the flow dividing surface is disposed at the bottom of the steamer pitcher proximate the center of the steaming pitcher.

11. The method of claim 9, wherein the flow dividing surface divides the combined flow of liquid and steam into two distinct recirculating flows at the bottom of the steaming pitcher that are initially directed downwardly and then curve away from each other and then turn upwardly.

12. The method of claim 11, wherein the flow dividing surface is disposed at the bottom of the steamer pitcher proximate the center of the steaming pitcher.

13. The method of claim 9, wherein the flow dividing surface is substantially conically shaped and disposed at the bottom of the pitcher, the bottom of the pitcher is substantially round and further wherein the flow dividing surface divides the combined flow of liquid and steam into a radially outward flow of liquid and steam that then curved upward and curves back into itself, wherein the flow field is substantially steady and occupies a three-dimensional toroidal volume within the pitcher.

14. The method of claim 13, wherein the flow dividing surface is disposed at the bottom of the steamer pitcher proximate the center of the steaming pitcher.

15. The method of claim 1, further comprising providing solid matter in the volume of liquid to be steamed which may be dissolved in the liquid.

16. The method of claim 1, wherein the liquid includes a dairy product.

17. The method of claim 16, further comprising providing solid matter in the volume of liquid to be steamed which may be dissolved in the liquid.

* * * * *